United States Patent
Peng et al.

(10) Patent No.: US 8,908,286 B2
(45) Date of Patent: Dec. 9, 2014

(54) ZOOM LENS SYSTEM

(75) Inventors: Fang-Ying Peng, New Taipei (TW); Hai-Jo Huang, New Taipei (TW); Sheng-An Wang, New Taipei (TW); An-Tze Lee, New Taipei (TW); Xiao-Na Liu, Guangdong (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 230 days.

(21) Appl. No.: 13/436,981

(22) Filed: Apr. 1, 2012

(65) Prior Publication Data

US 2013/0155511 A1  Jun. 20, 2013

(30) Foreign Application Priority Data

Dec. 17, 2011  (CN) .......................... 2011 1 0423659

(51) Int. Cl.
  *G02B 15/14* (2006.01)
  *G02B 27/64* (2006.01)
  *G02B 9/12* (2006.01)
  *G02B 15/177* (2006.01)

(52) U.S. Cl.
  CPC ...... *G02B 15/177* (2013.01); *G03B 2205/0007* (2013.01); *G02B 9/12* (2013.01); *G02B 27/646* (2013.01)
  USPC ............ 359/689; 359/682; 359/557; 359/784

(58) Field of Classification Search
  CPC ...... G02B 15/177; G02B 27/646; G02B 9/12; G02B 9/64; G03B 2205/0007
  USPC ......... 359/557, 676, 677, 680–684, 686–691, 359/694, 695, 708, 745–776, 779, 781–787, 359/793
  See application file for complete search history.

(56) References Cited

U.S. PATENT DOCUMENTS

| | | | | |
|---|---|---|---|---|
| 5,963,379 | A * | 10/1999 | Sato et al. | 359/691 |
| 5,991,096 | A | 11/1999 | Estelle | |
| 6,124,984 | A * | 9/2000 | Shibayama et al. | 359/689 |
| 7,019,911 | B2 * | 3/2006 | Saruwatari | 359/680 |
| 7,023,623 | B2 * | 4/2006 | Miyatake et al. | 359/676 |
| 7,042,651 | B2 * | 5/2006 | Kuba et al. | 359/682 |

(Continued)

FOREIGN PATENT DOCUMENTS

| | | |
|---|---|---|
| JP | H10170826 | 6/1998 |
| JP | 2008298894 | 12/2008 |

(Continued)

*Primary Examiner* — Thomas K Pham
*Assistant Examiner* — Nicholas Pasko
(74) *Attorney, Agent, or Firm* — Novak Druce Connolly Bove + Quigg LLP

(57) ABSTRACT

A zoom lens system includes, in order from the object side to the image side, a first, a second, and a third lens groups. The first lens group includes, in order from the object side to the image side, a first and a second lenses. The second lens group is capable of floating to realize an image stabilizating function and includes, in order from the object side to the image side, a third to sixth lenses. The zoom lens system satisfies various formulas, including $0.3 < d2a/D2 < 0.4$, wherein $d2a$ is the distance between image-side surfaces of the fifth lens and of the sixth lens, and $D2$ is a width of the second lens group along an optical axis of the zoom lens system.

7 Claims, 14 Drawing Sheets

(56) References Cited

U.S. PATENT DOCUMENTS

| | | | | |
|---|---|---|---|---|
| 7,212,349 | B2* | 5/2007 | Mitsuki | 359/682 |
| 7,589,907 | B2* | 9/2009 | Yamamoto | 359/682 |
| 7,843,647 | B2* | 11/2010 | Sato | 359/676 |
| 8,564,887 | B2* | 10/2013 | Yamasaki et al. | 359/682 |
| 2010/0254023 | A1* | 10/2010 | Ito | 359/682 |
| 2011/0115946 | A1* | 5/2011 | Saruwatari | 348/240.3 |

FOREIGN PATENT DOCUMENTS

| | | |
|---|---|---|
| JP | 2009020337 | 1/2009 |
| JP | 2010117677 | 5/2010 |
| JP | 2011107312 | 6/2011 |
| JP | 2011145566 | 7/2011 |

\* cited by examiner

ZOOM LENS SYSTEM

BACKGROUND

1. Technical Field

The present disclosure relates to lens systems and, particularly, to a zoom lens system with a lens-based optical image stabilization function.

2. Description of Related Art

Some zoom lens systems employ a floating lens group which is movable to compensate for vibrations of the zoom lens system to reduce blurring associated with vibration during exposure. However, in designing, it is hard to determine a length of the floating lens group. Specifically, if the length is too long, the floating lens group may be too heavy and thus can not be moved quickly enough for the compensation. Also, a total length of the zoom lens system can not be effectively controlled. On the contrary, if the length is too short, aberrations in the operation of the zoom lens system can not be effectively controlled. Also, convenient but precise assembly of the zoom lens system becomes difficult as the gaps between lenses in the floating lens group are too small.

Therefore, it is desirable to provide a zoom lens system which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the drawings.

Figure 1:
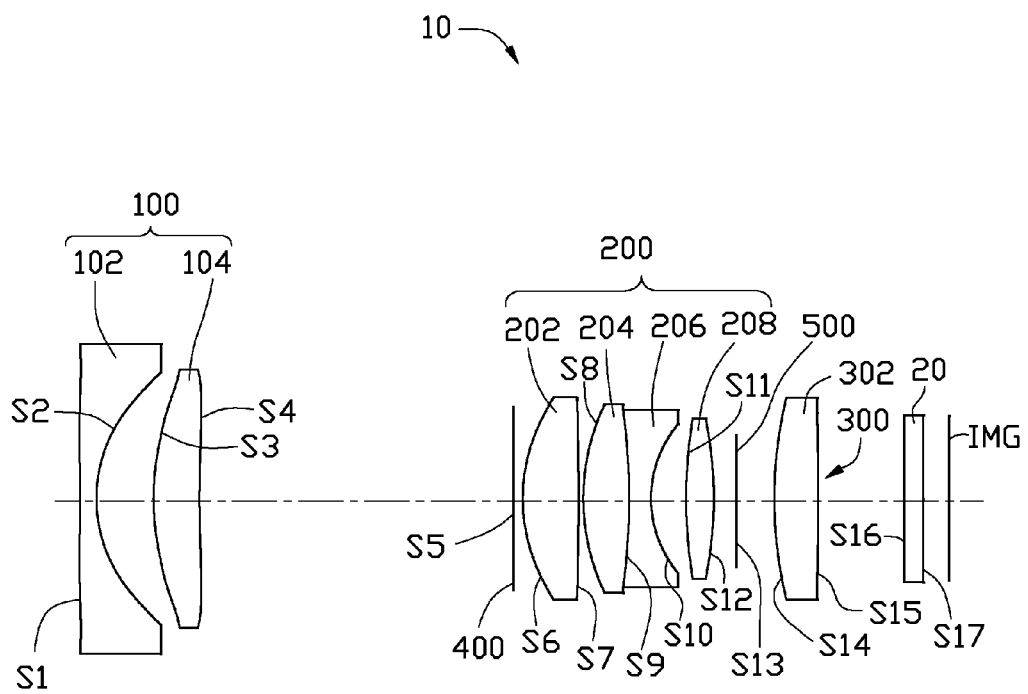
FIG. 1 is a schematic view of a zoom lens system, according to an embodiment.
Figure 2:
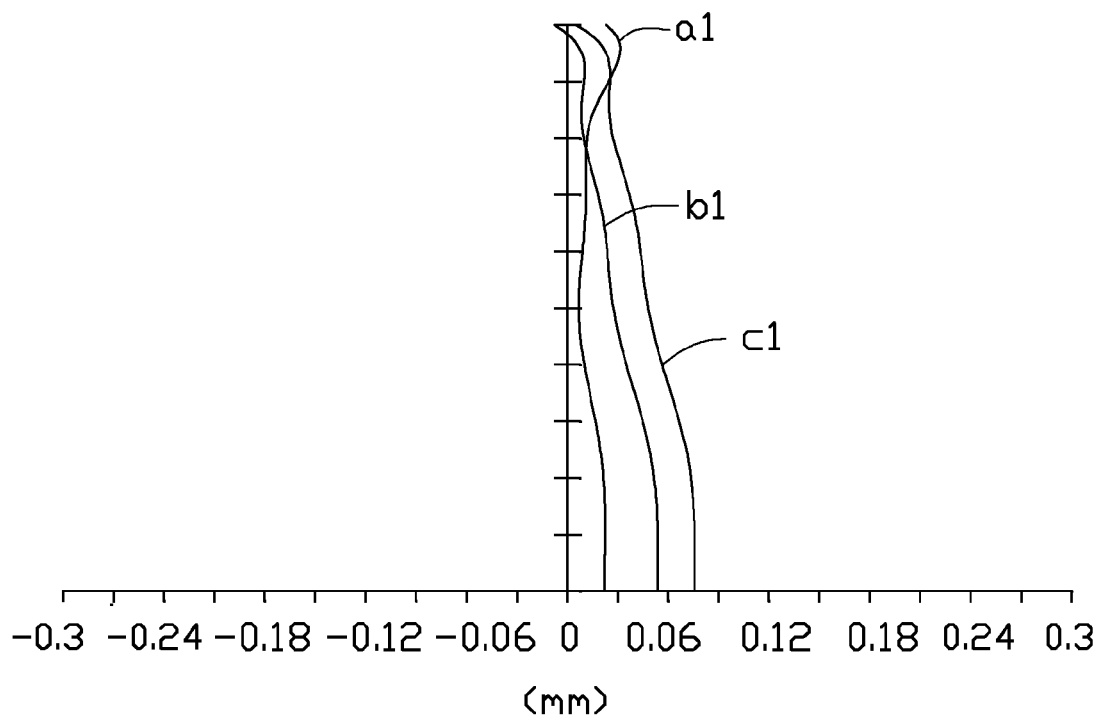
FIGS. 2-4 show spherical aberrations, field curvature, and distortion occurring in the zoom lens system of FIG. 1, in a wide-angle state.
Figure 3:
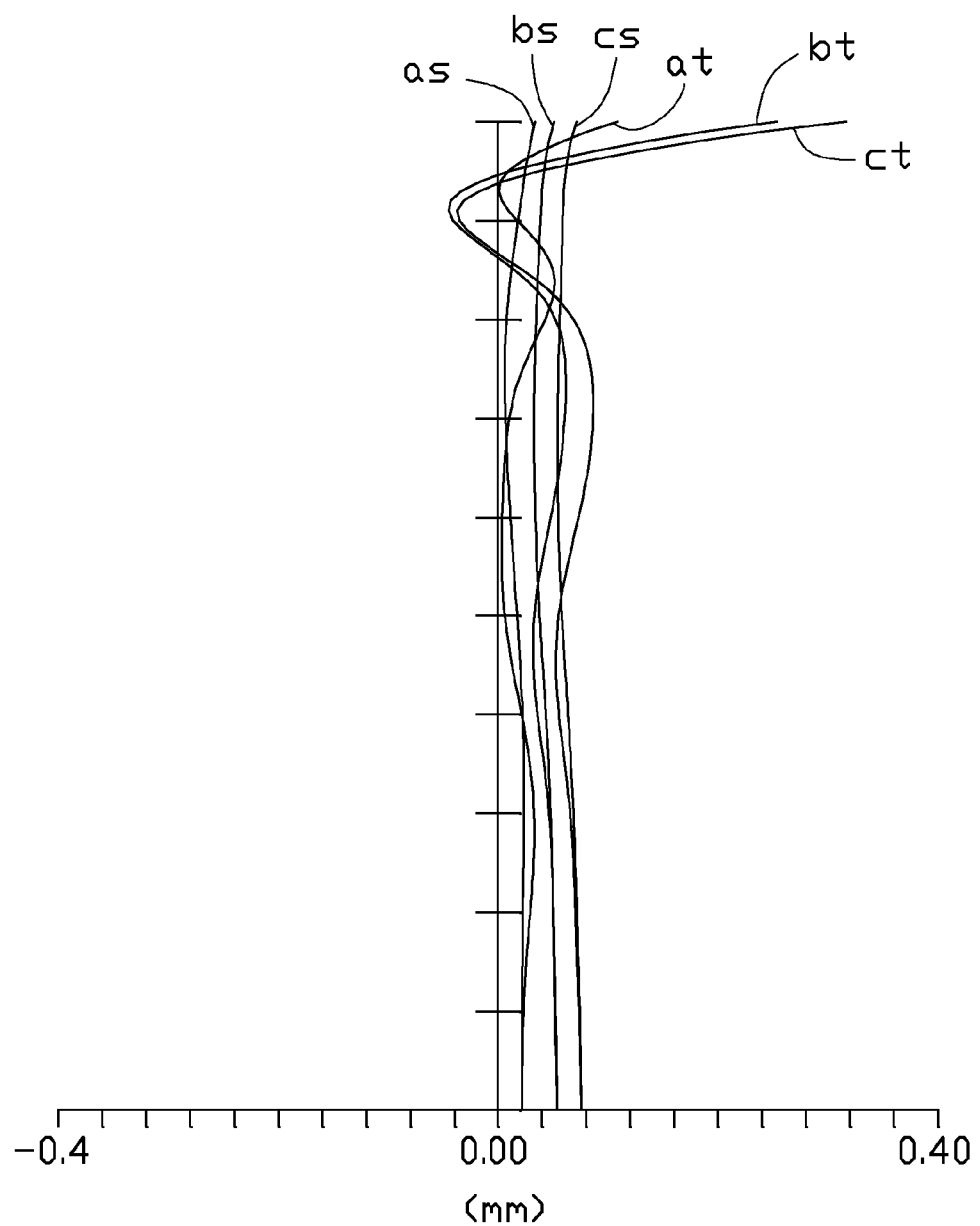
Figure 4:
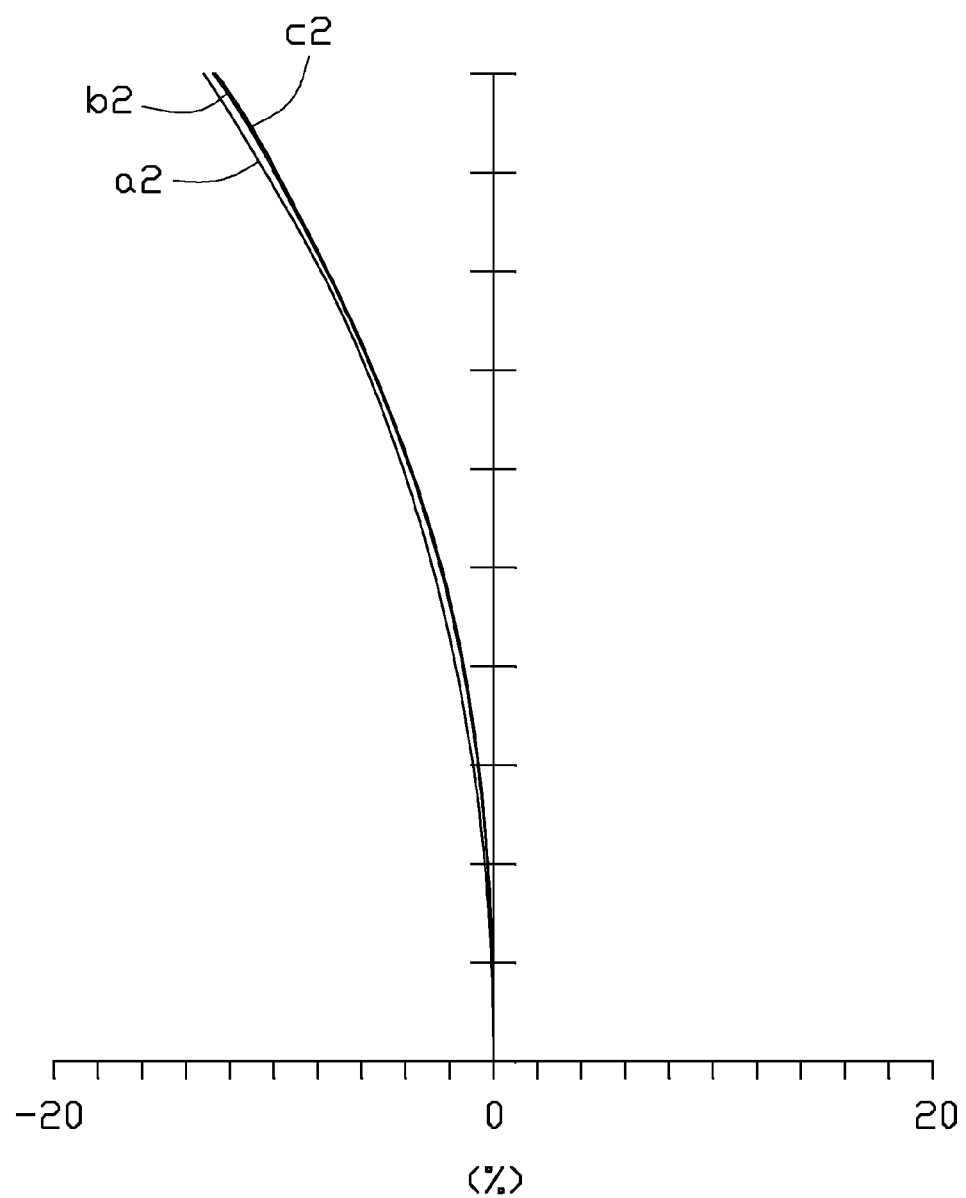
Figure 5:
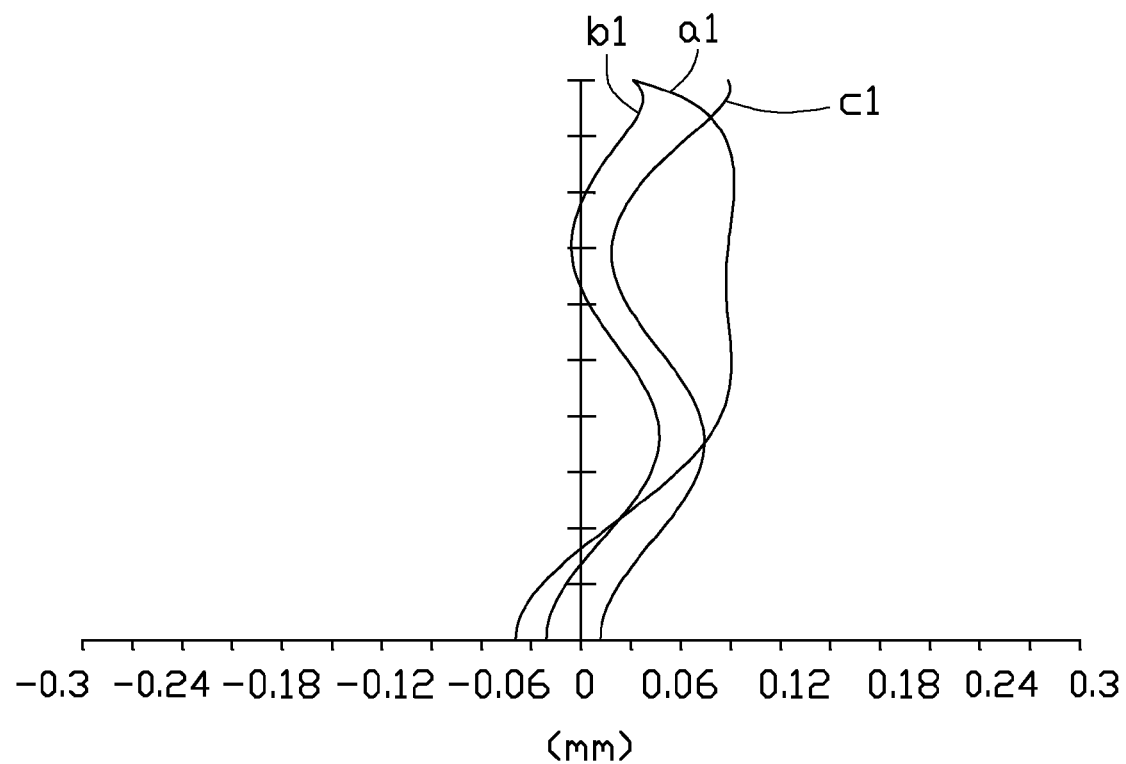
FIGS. 5-7 show spherical aberrations, field curvature, and distortion occurring in the zoom lens system of FIG. 1, in a telephoto state.
Figure 6:
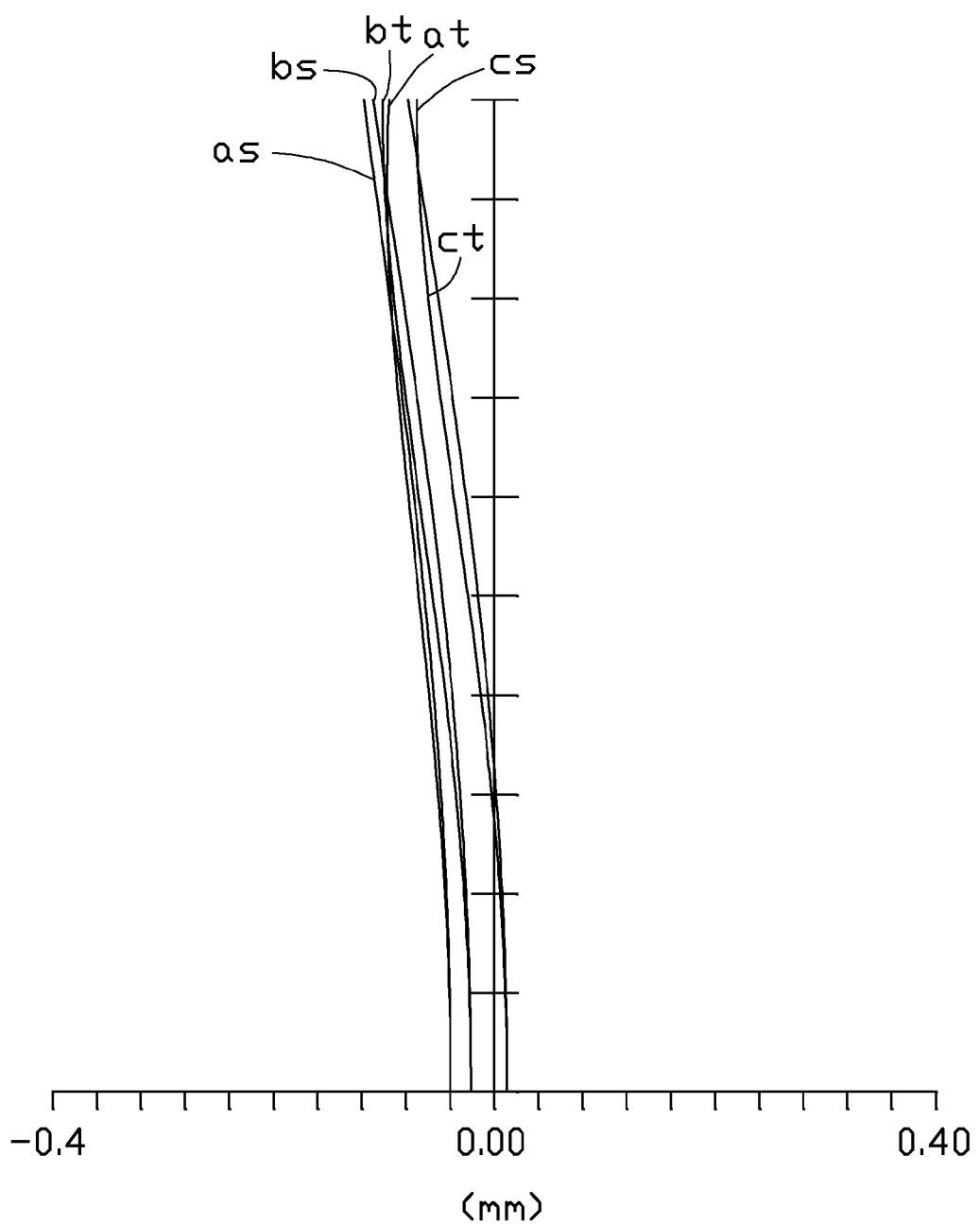
Figure 7:
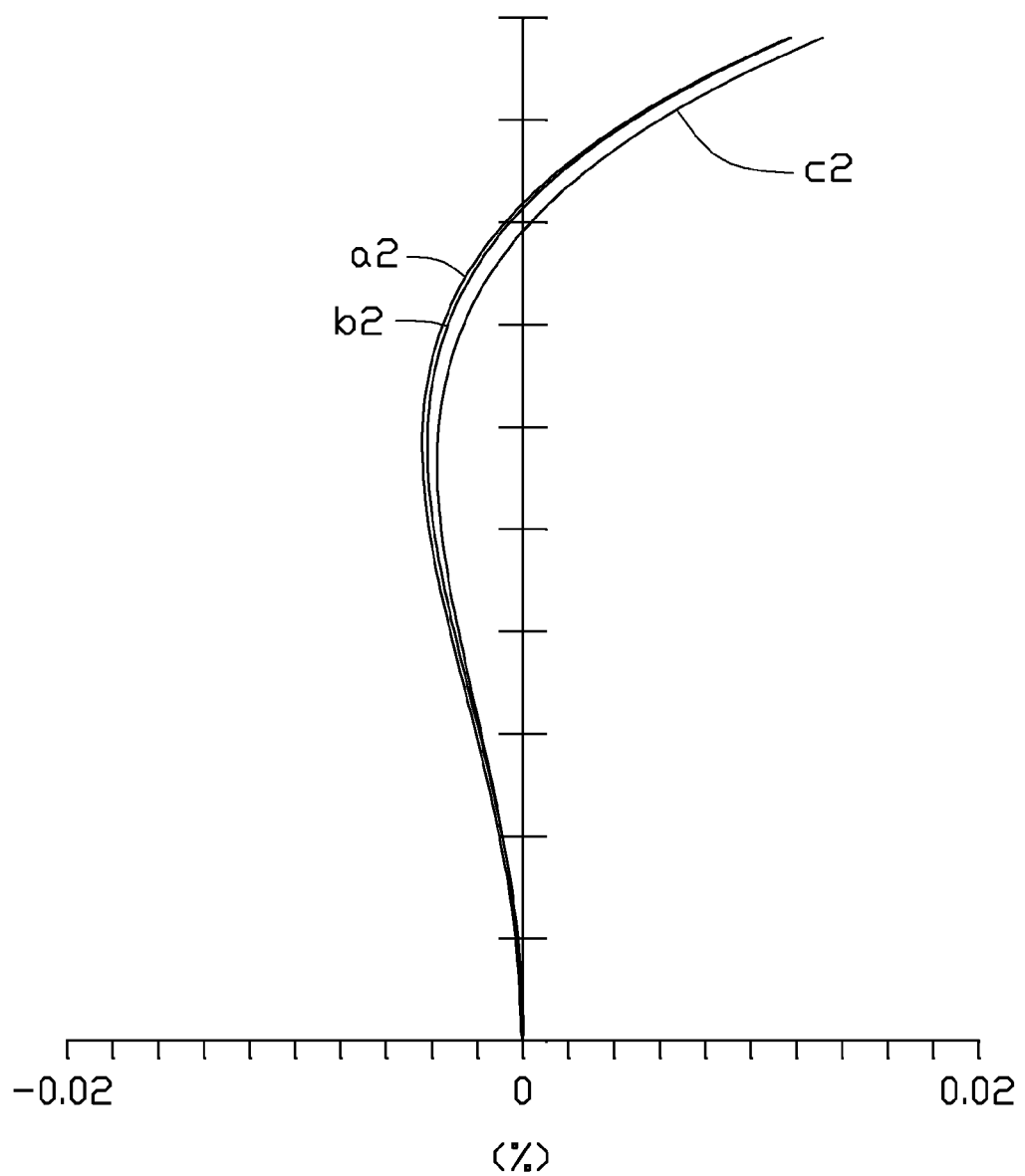

Referring to FIG. 1, a zoom lens system 10, according to an embodiment, includes, in order from the object side to the image side thereof, a first lens group 100 of negative refractive power, a second lens group 200 of positive refractive power, and a third lens group 300 of positive refractive power. The first lens group 100 includes, in order from the object side to the image side of the zoom lens system 10, a first lens 102 of negative refractive power and a second lens 104 of positive refractive power. The second lens group 200 is capable of floating to realize an image stabilization function and includes, in order from the object side to the image side of the zoom lens system 10, a third lens 202 of positive refractive power, a fourth lens 204 of positive refractive power, a fifth lens 206 of negative refractive power, and a sixth lens 208 of positive refractive power. The third lens group 300 includes a seventh lens 302 of positive refractive power.

The zoom lens system 100 satisfies the following formula (formula (1)): $0.3 < d2a/D2 < 0.4$, wherein d2a is a length of the optical axis of the zoom lens system 10 between the image-side surface of the fifth lens 206 (the surface of the fifth lens 206 facing the image side of the zoom lens system 10) and the image-side surface of the sixth lens 208 (the surface of the sixth lens 208 facing the image side of the zoom lens system 10) (that is, the distance between the image-side surface of the fifth lens 206 and the image-side surface of the sixth lens 208 along the optical axis of the zoom lens system 10), and D2 is a length of an orthogonal projection of a connecting line on the optical axis of the zoom lens system 10, the connecting line connects between a point of the second lens group 200 closest to the object side of the zoom lens system 10 and a point of the second lens group 200 closest to the image side of the zoom lens system 10. That is, D2 is the width of the second lens group 200 along the optical axis of the zoom lens system 100.

By satisfying the formula (1), factors such as the enhancement of an image stabilizing capacity, the reduction of a total length, positive control of aberrations, and ease of assembly can all be balanced or compromised in the zoom lens system 10. If D2 is too large to satisfy the formula (1), the second lens group 200 may become too heavy to be quick and precise movements. As such, it becomes hard to enhance the image stabilization capacity of the zoom lens system 10. If D2 is too small to satisfy the condition formula (1), aberrations occurring in the zoom lens system 10 cannot be effectively controlled. If d2a is too large to satisfy the condition formula (1), the total length of the zoom lens system 10 becomes too long for effective control. If d2a is too small to satisfy the condition formula, the gap between the fifth lens 206 and the sixth lens 208 may be too short to ensure smooth and trouble-free assembly of the zoom lens system 10.

To capture images, light rays from object(s) enters into the zoom lens system 10 via the object side thereof, pass through the first lens group 100, the second lens group 200, and the third lens group 300, then pass a cover glass 20, and finally form images on an image plate IMG. The zoom lens system 10 can be zoomed between a wide-angle state (with the shortest focal length) and a telephoto state (with the longest focal length). The distance between the first lens group 100 and the second lens group 200 decreases while the distance between the second lens group 200 and the third lens group 300 increases when the zoom lens group 10 changes from the wide-angle state to the telephoto state.

The first lens 102 is a glass lens and has at least one aspheric surface. For this reason, the distortion and astigmatism of the zoom lens system 10 in the telephoto state can be effectively controlled.

The zoom lens system 10 also satisfies the following formula (formula (2)): $0.27 < \psi 1/L < 0.31$, wherein $\psi 1$ is an effective radii of the first lens 102, and L is the total length of the zoom lens system 10 in the telephoto state.

By satisfying the formula (2), factors such as cost reduction, control of aberrations and miniaturization of the zoom lens system 10 can be balanced and compromised. If $\psi 1$ is too large to satisfy the formula (2), a large glass aspheric lens is needed as the first lens 102 and thus the cost of the zoom lens system 10 remains high. If $\psi 1$ is too small to satisfy the formula (2), the color aberration occurring in the zoom lens system 10 in the wide-angle state cannot be effectively controlled. If L is too large to satisfy the formula (2), the total length of the zoom lens system 10 cannot be reduced and thus there is no effective miniaturization of the zoom lens system 10.

The zoom lens system 10 also satisfies the following formula (formula (3)): $18 < N1-N2 < 25$, wherein N1 and N2 are the Abbe numbers of the first lens 102 and the second lens 104 respectively, in light at the wavelength of 587.6 nm ("d light"). In this way, any color aberrations occurring in the zoom lens system 10 can be further restricted.

The zoom lens system 10 also satisfies the following formula (formula (4)): $0.9 < f2/\sqrt{fW*fT} < 1$, wherein f2 is the effective focal length of the second lens group 200, fW is the effective focal length of the zoom lens system 10 in the wide-angle state, and fT is the effective focal length of the zoom lens system 10 in the telephoto state.

By satisfying the formula (4), factors such as the enhancement of yield rate and the increase of zoom ratio, and the reduction of the total length of the zoom lens system 10 can be balanced or compromised. If f2 is too small to satisfy the formula (4), the refractive power of the second lens group 200 become too large and the eccentric tolerance thereof becomes stricter, reducing the yield rate of the zoom lens system 10. If f2 is too large to satisfy the formula (4), to maintain the same zoom ratio, the distance that the second lens group 200 must travel increases. As such, the total length of the zoom lens system 10 in the telephoto state cannot be effectively controlled.

The third lens 202 includes at least one aspheric surface. For this reason, the spherical aberrations and color aberrations of the zoom lens system 10 in both the wide-angle state and the telephoto state can be controlled.

The seventh lens 302 is made of abnormal dispersive glass and has a relatively high Abbe number. For this reason, any lateral color aberrations of the zoom lens system 10 in the telephoto state can be effectively controlled.

The zoom lens system 10 includes a first aperture step 400 and a second aperture stop 500. The first aperture stop 400 is positioned between the first lens group 100 and the second lens group 200. The second aperture stop 500 is positioned between the second lens group 200 and the third lens group 300.

The zoom lens group 10 includes, in order from the object side to the image side thereof, the surfaces S1 to S15. The fourth and fifth lenses 204, 206 are combined together, The cover glass 20 includes a surface S16 facing the zoom lens system 100 and a surface S17 facing away from the zoom lens system 10.

The zoom lens system 10 satisfies Table 1, wherein the following symbols are used:

T: is the type of each surface, wherein S represents a standard or regular surface (including spherical and flat), and A represents an aspheric surface, R: is the curvature radius of each surface;

D: is the distance between each two adjacent surfaces along the optical axis of the zoom lens system 10;

N: is the refractive index of each lens or the cover glass 20 in d light;

V: is the Abbe number of each lens or the cover glass 20 in d light;

k: is the conic constant; and

ψ: is the effective radii of each surface.

TABLE 1

| Surface | T | R(mm) | D(mm) | N | V | k | Ψ(mm) |
|---|---|---|---|---|---|---|---|
| S1 | A | −69.55119 | 0.7 | 1.801387 | 45.449725 | | 13.2 |
| S2 | A | 6.016587 | 2.424868 | | | | 10.76 |
| S3 | A | 9.615589 | 1.95 | 1.632720 | 23.239886 | −2.086485 | 11 |
| S4 | A | 34.12956 | D4(see Table 3) | | | | 10.9 |
| S5 | S | Infinity | 0.4 | | | | 6.5 |
| S6 | A | 7.268398 | 2.373604 | 1.696799 | 55.461191 | −0.324651 | 8.6 |
| S7 | A | −101.3093 | 0.2 | | | 469.2873 | 8.44 |
| S8 | S | 9.321346 | 1.94538 | 1.733997 | 51.488026 | | 8 |
| S9 | S | −28.47018 | 0.9314244 | 1.903658 | 31.315013 | | 7.54 |
| S10 | S | 4.939206 | 1.493971 | | | | 6.34 |
| S11 | S | 20.98801 | 1.171948 | 1.516798 | 64.198266 | | 6.68 |
| S12 | S | −16.9635 | 0.35 | | | | 6.8 |
| S13 | S | infinity | D13(see Table 3) | | | | 5.6 |
| S14 | S | 18.30177 | 1.859803 | 1.437001 | 95.100387 | | 8.58 |
| S15 | S | −160.0444 | D15(see Table 3) | | | | 8.47 |
| S16 | S | infinity | 0.8 | 1.516798 | 64.198266 | | 7.88 |
| S17 | S | infinity | 1.1 | | | | 7.81 |
| IMG | S | infinity | | | | | 7.66 |

The aspherical surface is shaped according to the formula:

$$x = \frac{ch^2}{1 + \sqrt{1-(k+1)c^2h^2}} + \sum A_i h^i,$$

where h is the height from the optical axis of the zoom lens system 10 to a point on the aspherical surface, c is the vertex curvature, and Ai is the correction coefficient of the aspherical surface to the i-th order. The zoom lens system 10 satisfies Table 2.

TABLE 2

| | S1 | S2 | S3 |
|---|---|---|---|
| A4 | 0.00047101654 | 0.00034574209 | −0.0014554811 |
| A6 | 1.4008352e−005 | 7.228323e−005 | −1.0557508e−006 |
| A8 | −1.4843539e−006 | −1.209355e−006 | 6.3516489e−006 |
| A10 | 3.7747414e−008 | 3.9884932e−008 | −3.7716402e−007 |
| A12 | −4.5355091e−010 | −1.0268225e−008 | 1.2522275e−008 |
| A14 | 3.679731e−012 | 4.1465027e−010 | −3.1198525e−010 |
| A16 | −2.215282e−014 | −4.6873128e−012 | 3.7475194e−012 |

| | S4 | S6 | S7 |
|---|---|---|---|
| A4 | −0.0008428731 | −3.3378854e−005 | 0.00025990558 |
| A6 | −1.8323629e−005 | −2.3537521e−006 | −2.1849577e−005 |
| A8 | 3.9144255e−006 | −1.7424504e−006 | 2.2149963e−006 |
| A10 | −1.2938054e−007 | 2.7915583e−007 | −1.4375988e−007 |
| A12 | 2.0862163e−010 | −1.8988201e−008 | 8.093376e−009 |
| A14 | 2.9094878e−011 | 6.044136e−010 | −3.6314967e−010 |
| A16 | −1.0176809e−013 | −7.7983162e−012 | 7.2683688e−012 |

The zoom lens system 10 satisfies Table 3, wherein the following symbols are used:
F: is the effective focal length of the zoom lens system 10;
F#: is the F number, and
FOV: is the angle of the field of view in degrees.

TABLE 3

|  | F (mm) | F# | FOV (degree) | D4(mm) | D13(mm) | D15(mm) |
|---|---|---|---|---|---|---|
| Wide-angle | 4.6 | 1.88 | 82.4 | 21.41399 | 2.224779 | 3.665189 |
| medium | 13.4 | 3.67 | 34.22 | 4.334171 | 12.20505 | 4.113529 |
| Telephoto | 21.85 | 5.08 | 21 | 1.055695 | 22.79988 | 3.445584 |

The values of relevant parameters and the formulas are listed in Table 4:

TABLE 4

| d2a | D2 | ψ1 | L | fW | fT | f2 | N1 | N2 |
|---|---|---|---|---|---|---|---|---|
| 2.66 | 8.12 | 13.88 | 45 | 4.6 | 21.85 | 9.78 | 45.4 | 23.2 |

In FIGS. 2-7, the curves a1, b1, and c1 show the spherical aberration characteristics of the zoom lens system 10 in lights of the wavelengths 435 nm, 586 nm, 652 nm. The curves at, as, bt, bs, ct, and cs show the meridional and sagittal field curvatures of the zoom lens system 10 in lights of the wavelengths 435 nm, 586 nm, 652 nm. The curves a2, b2, and c2 show the distortion characteristics of the zoom lens system 10 in lights at the wavelengths 435 nm, 586 nm, 652 nm. As shown in FIGS. 2-7, the various aberrations occurring in the zoom lens system 10 are controlled, increasing the resolution of the zoom lens system 10.

Figure 8:
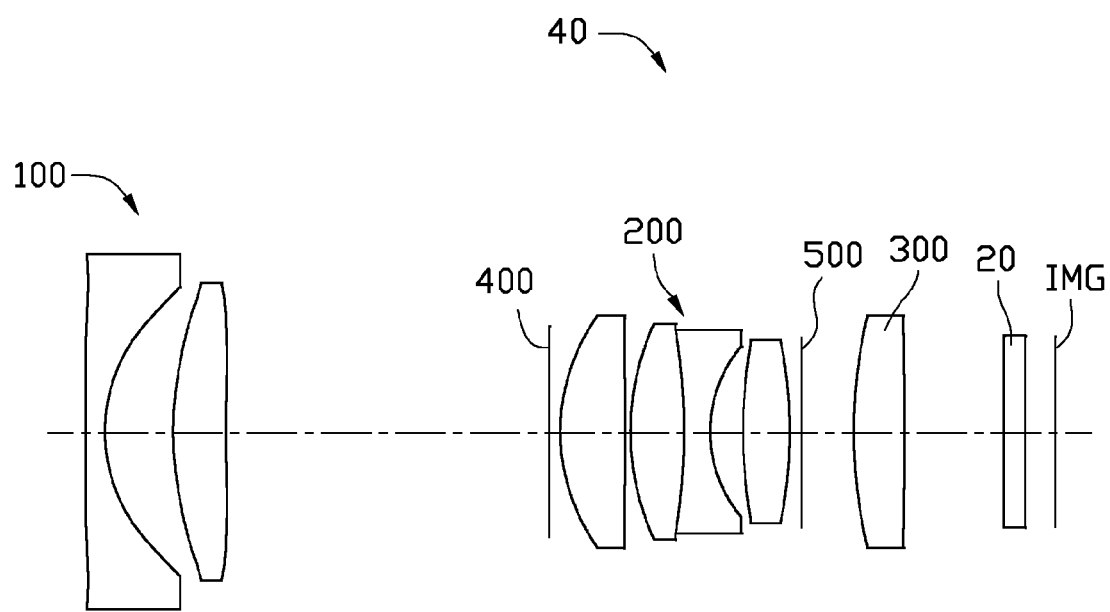
FIG. 8 is a schematic view of a zoom lens system, according to another embodiment.
Figure 9:
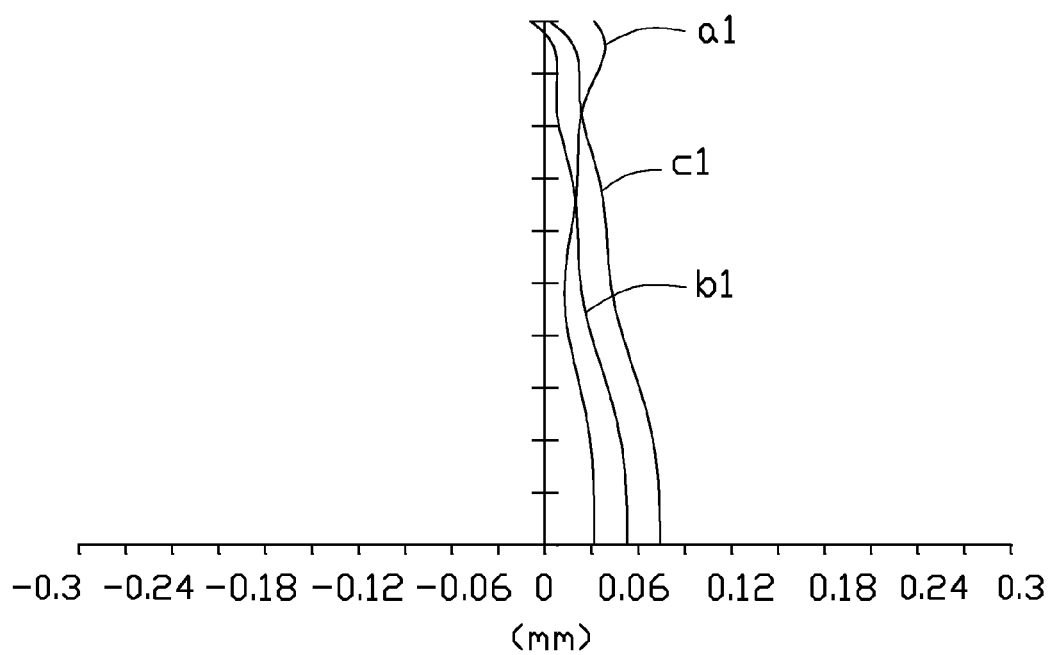
FIGS. 9-11 show spherical aberrations, field curvature, and distortion occurring in the zoom lens system of FIG. 8, in the wide-angle state.
Figure 10:
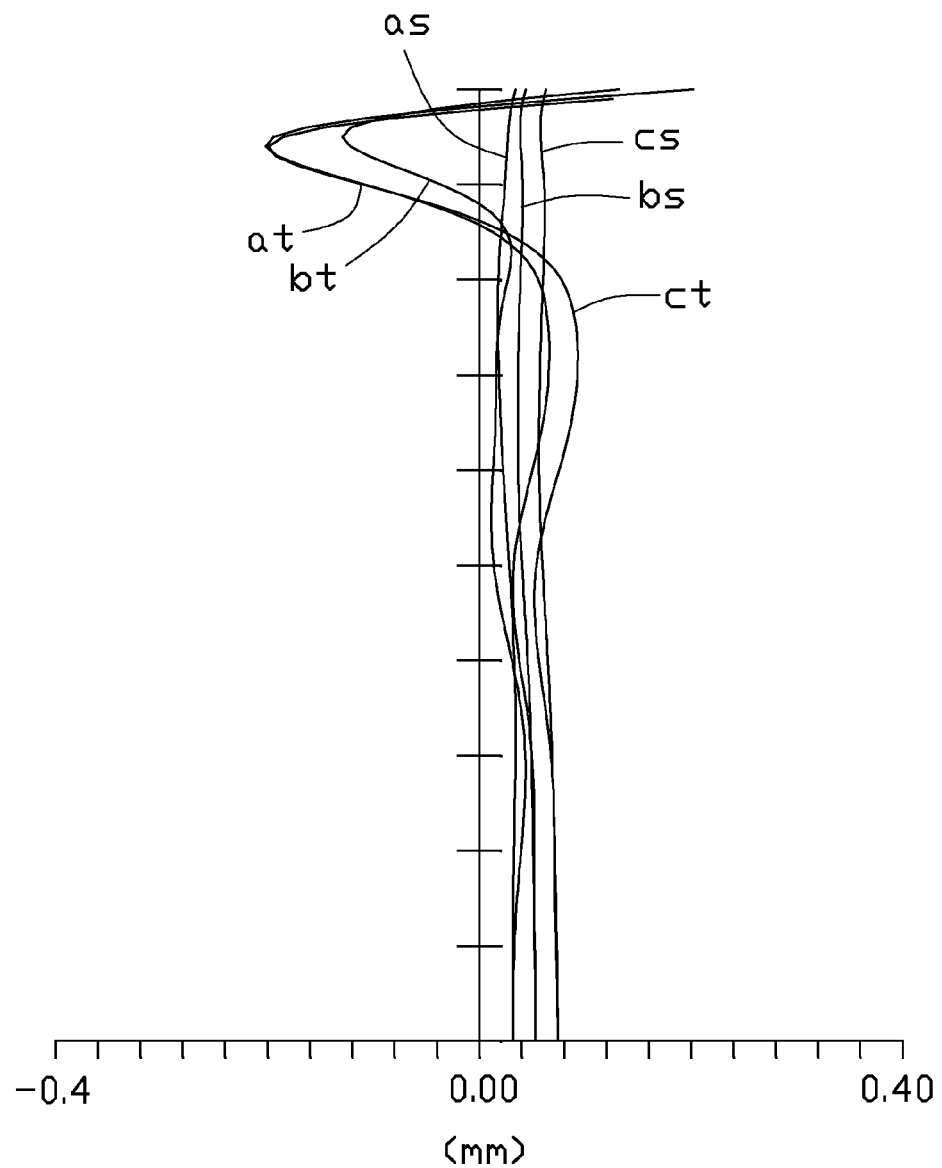
Figure 11:
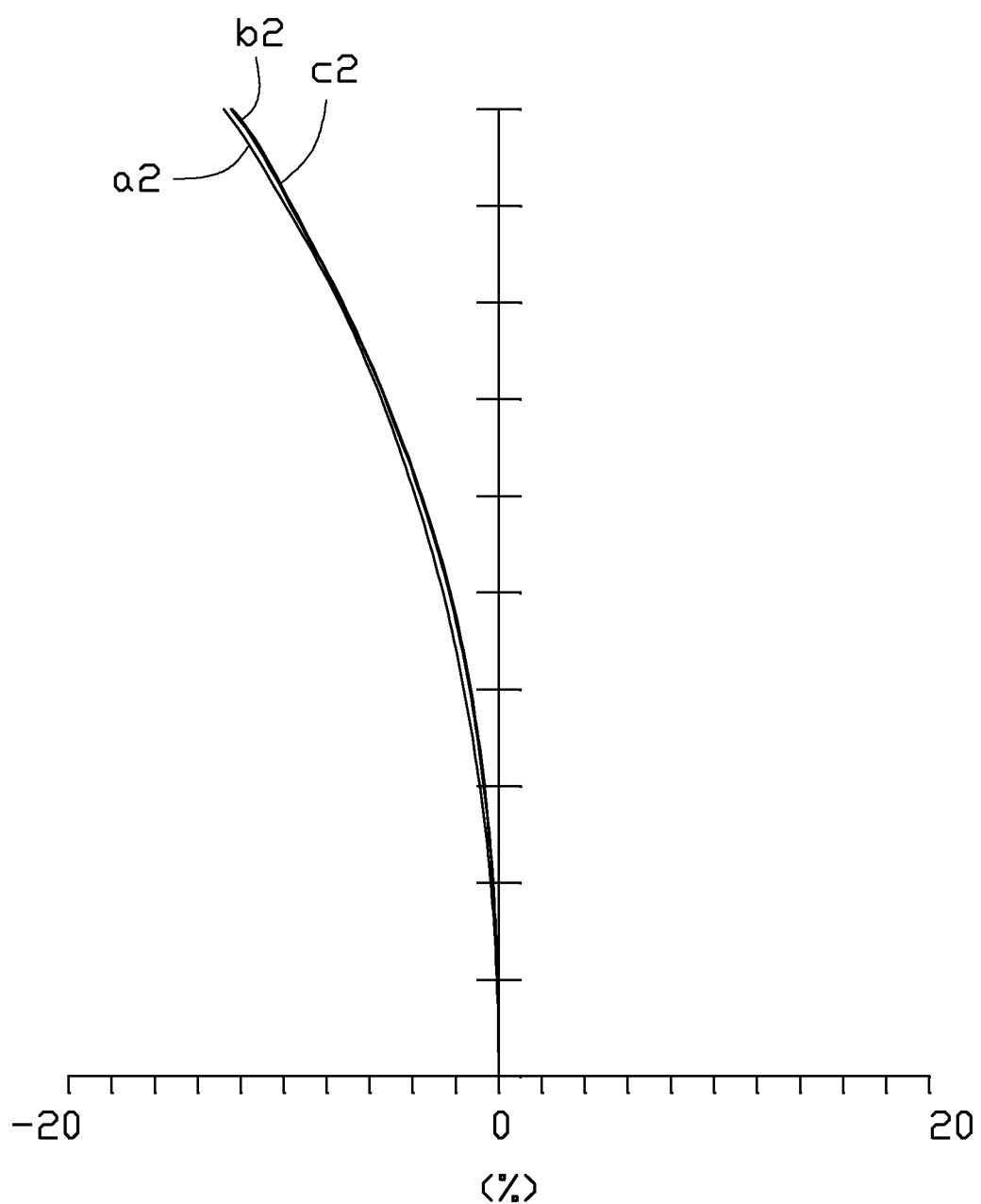
Figure 12:
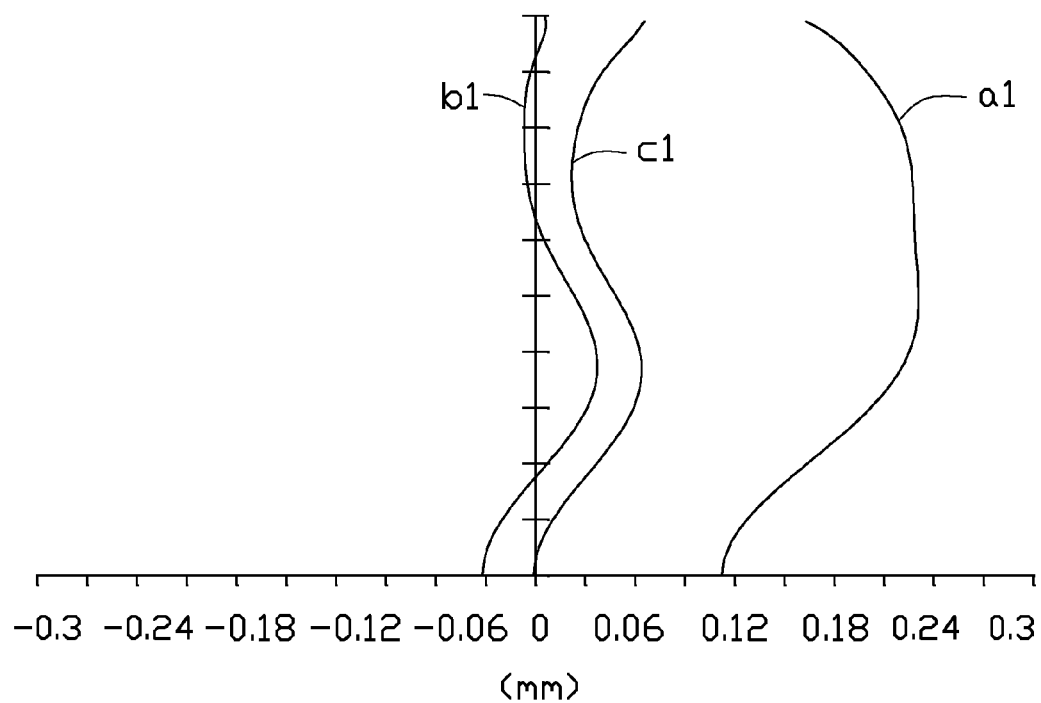
FIGS. 12-14 show spherical aberrations, field curvature, and distortion occurring in the zoom lens system of FIG. 8, in a telephoto state.
Figure 13:
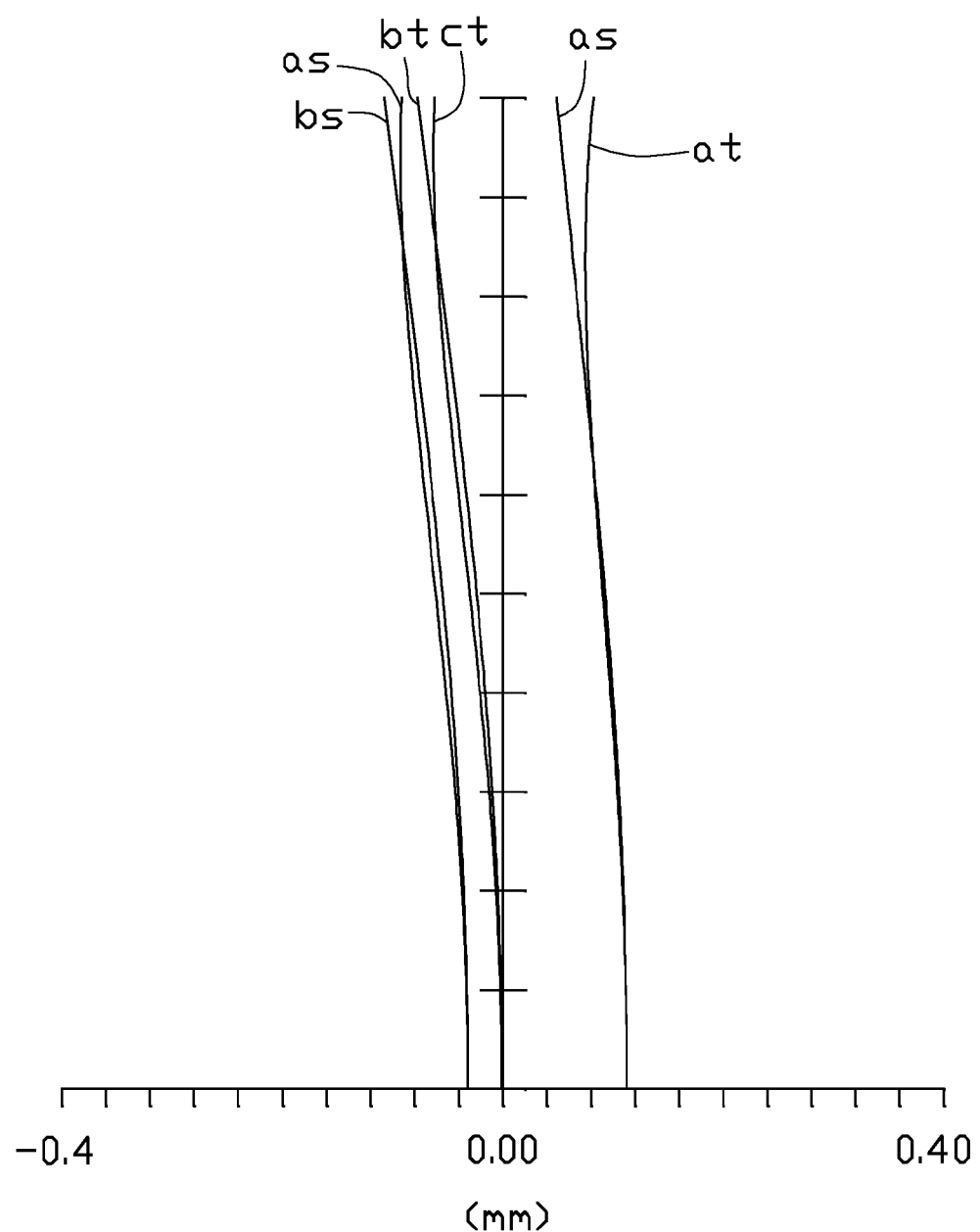
Figure 14:
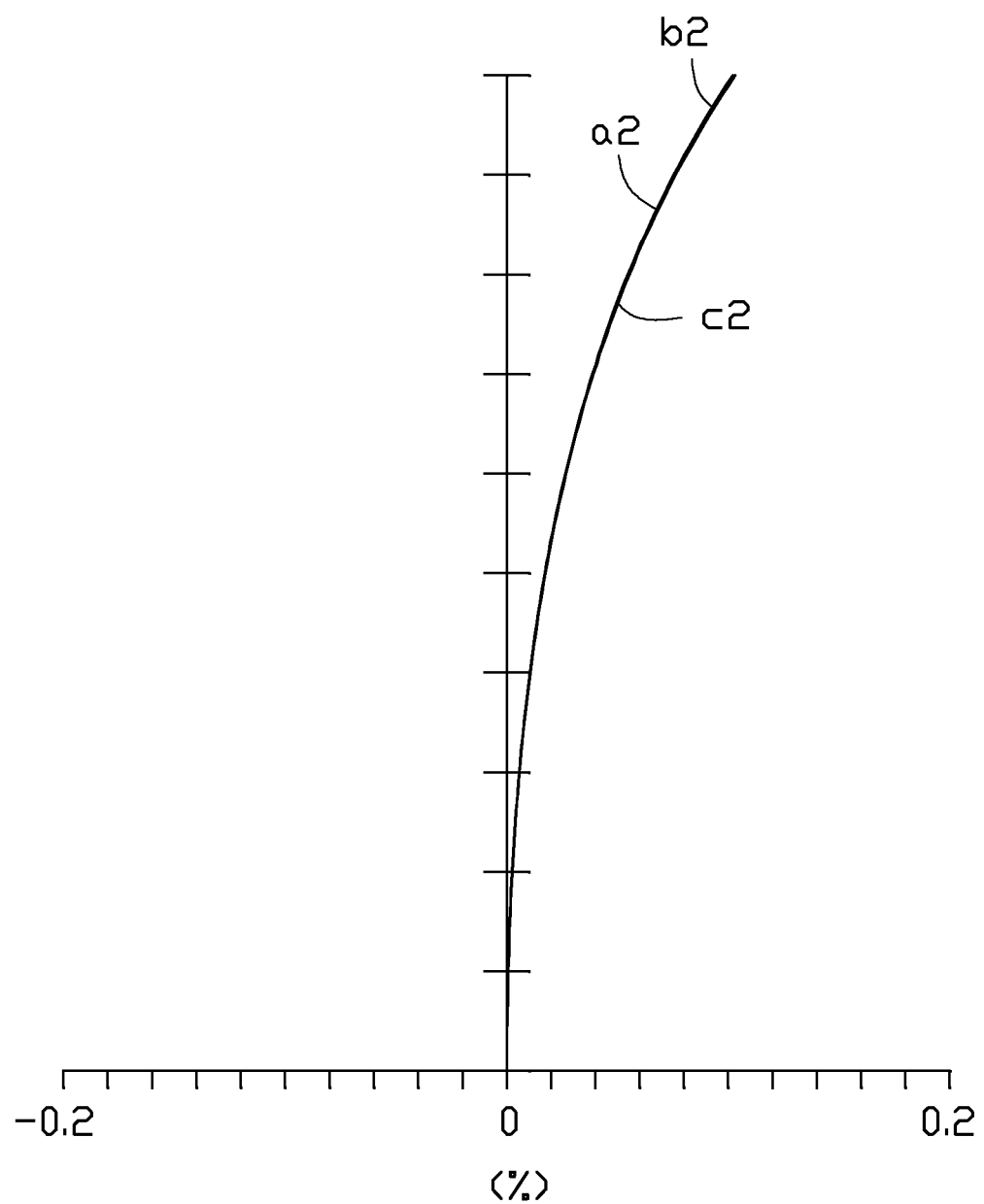

Referring to FIG. 8, a zoom lens system 40, according to another embodiment, is substantially similar to the zoom lens system 10, but satisfies the conditions of Tables 5-8, instead of those of Tables 1-4.

TABLE 5

| Surface | T | R(mm) | D(mm) | N | V | k | Ψ(mm) |
|---|---|---|---|---|---|---|---|
| S1 | A | −98.46029 | 0.7 | 1.801387 | 45.449725 |  | 13.10551 |
| S2 | A | 5.874068 | 2.513507 |  |  | −2.086485 | 10.68169 |
| S3 | A | 10.60488 | 1.95 | 1.632720 | 23.239886 |  | 10.9836 |
| S4 | A | 45.92312 | D4(see Table 7) |  |  |  | 10.9 |
| S5 | S | Infinity | 0.4 |  |  |  | 7.8 |
| S6 | A | 7.142632 | 2.392027 | 1.696799 | 55.461191 | −0.324651 | 8.6 |
| S7 | A | −100.8448 | 0.2 |  |  | 469.2873 | 8.38 |
| S8 | S | 9.588003 | 1.967434 | 1.733997 | 51.488026 |  | 7.97 |
| S9 | S | −23.43146 | 0.9698513 | 1.903658 | 31.315013 |  | 7.50 |
| S10 | S | 4.911284 | 1.218456 |  |  |  | 6.29 |
| S11 | S | 19.07473 | 1.715383 | 1.516798 | 64.198266 |  | 6.49 |
| S12 | S | −16.98823 | 0.35 |  |  |  | 6.75 |
| S13 | S | Infinity | D13(see Table 7) |  |  |  | 5.6 |
| S14 | S | 18.64119 | 1.859803 | 1.437001 | 95.100387 |  | 8.58 |
| S15 | S | −224.2224 | D15(see Table 7) |  |  |  | 7.197 |
| S16 | S | Infinity | 0.8 | 1.516798 | 64.198266 |  | 7.08 |
| S17 | S | Infinity | 1.1 |  |  |  | 7.07 |
| IMG | S | Infinity |  |  |  |  | 7.03 |

TABLE 6

|  | S1 | S2 | S3 |
|---|---|---|---|
| A4 | 0.00040658648 | 0.00048896076 | −0.0012950598 |
| A6 | 1.45534e−005 | 5.7620275e−005 | −1.3609201e−005 |
| A8 | −1.3753833e−006 | −3.9743775e−007 | 6.7503352e−006 |
| A10 | 3.4929073e−008 | 4.4605464e−008 | −3.7905691e−00 |
| A12 | −4.912527e−010 | −1.0939761e−008 | 1.2490291e−008 |

TABLE 6-continued

| A14 | 4.8905254e−012 | 3.9446741e−010 | −3.0498477e−010 |
| A16 | −2.6693337e−014 | −4.0155181e−012 | 3.5906385e−012 |

|  | S4 | S6 | S7 |
|---|---|---|---|
| A4 | −0.00080615733 | −3.6206746e−006 | 0.00030079907 |
| A6 | −2.4403447e−005 | −2.3716119e−006 | −2.0541834e−005 |
| A8 | 3.9173695e−006 | −1.649481e−006 | 2.2379033e−006 |
| A10 | −1.239386e−007 | 2.8111507e−007 | −1.413212e−007 |
| A12 | 2.0857651e−010 | −1.9070272e−008 | 8.2284884e−009 |
| A14 | 3.194075e−011 | 6.0405204e−010 | −3.5784732e−010 |
| A16 | −1.8120136e−013 | −7.006543e−012 | 7.7898027e−012 |

TABLE 7

|  | F (mm) | F# | FOV (degree) | D4(mm) | D13(mm) | D15(mm) |
|---|---|---|---|---|---|---|
| Wide-angle | 4.6 | 1.89 | 82 | 21.18002 | 2.020686 | 3.665189 |
| Medium | 13.4 | 3.7 | 32.6 | 4.233274 | 11.98141 | 4.113529 |
| Telephoto | 21.85 | 5.15 | 20.1 | 1.05817 | 22.80781 | 2.999124 |

TABLE 8

| d2a | D2 | ψ1 | L | fW | fT | f2 | N1 | N2 |
|---|---|---|---|---|---|---|---|---|
| 2.93 | 8.46 | 13.16 | 45 | 4.6 | 21.85 | 9.62 | 45.4 | 23.2 |

As shown in FIGS. 9-14, the various aberrations occurring in the zoom lens system 40 are controlled, increasing the resolution of the zoom lens system 40.

It will be understood that the above particular embodiments are shown and described by way of illustration only. The principles and the features of the present disclosure may be employed in various and numerous embodiment thereof without departing from the scope of the disclosure. The above-described embodiments illustrate the possible scope of the disclosure but do not restrict the scope of the disclosure.

What is claimed is:

1. A zoom lens system, in this order from an object side to an image side thereof, comprising:
a first lens group of negative refractive power, the first lens group comprising, in this order from the object side to the image side of the zoom lens system, a first lens of negative refractive power and a second lens of positive refractive power;

a second lens group of positive refractive power, the second lens group being capable of floating to realize an image stabilization function and comprising, in this order from the object side to the image side of the zoom lens system, a third lens of positive refractive power, a fourth lens of positive refractive power, a fifth lens of negative refractive power, and a sixth lens of positive refractive power; and a third lens group of positive refractive power, the third lens group comprising a seventh lens of positive refractive power;

wherein the zoom lens system satisfies the following condition formula: $0.3<d2a/D2<0.4$, where d2a is a length of the optical axis of the zoom lens system between an image-side surface of the fifth lens and an image-side surface of the sixth lens, and D2 is a length of an orthogonal projection of a connection line on the optical axis of the zoom lens system, the connection line connects between a point of the second lens group closest to the object side of the zoom lens system and a point of the second lens group closest to the image side of the zoom lens system;

wherein the zoom lens system satisfies the following condition formula: $0.27<\psi1/L<0.31$, where $\psi1$ is an effective radius of the first lens, and L is the total length of the zoom lens system in the telephoto state.

2. The zoom lens system of claim 1, wherein the distance between the first lens group and the second lens group decreases while the distance between the second lens group and the third lens group increases when the zoom lens group changes from a wide-angle state to a telephoto state.

3. The zoom lens system of claim 1, wherein the first lens is a glass lens and has at least one aspheric surface.

4. The zoom lens system of claim 1, wherein the zoom lens system also satisfies the following condition formula: $18<N1-N2<25$, wherein here N1 and N2 are the Abbe numbers of the first lens and the second lens in light at the wavelength of 587.6 nm, respectively.

5. The zoom lens system of claim 1, wherein the zoom lens system also satisfies the following condition formula: $0.9<f2/\sqrt{fW*fT}<1$, wherein f2 is the effective focal length of the second lens group, fW is the effective focal length of the zoom lens system in the wide-angle state, and fT is the effective focal length of the zoom lens system in the telephoto state.

6. The zoom lens system of claim 1, wherein the third lens includes at least one aspheric surface.

7. The zoom lens system of claim 1, further comprising a first aperture stop and a second aperture stop, the first aperture stop being positioned between the first lens group and the second lens group, the second aperture stop being positioned between the second lens group and the third lens group.

* * * * *